March 17, 1970  R. L. FRANZ ET AL  3,500,722
ELECTRO-MAGNETIC TRANSDUCER
Original Filed June 20, 1966  2 Sheets-Sheet 2

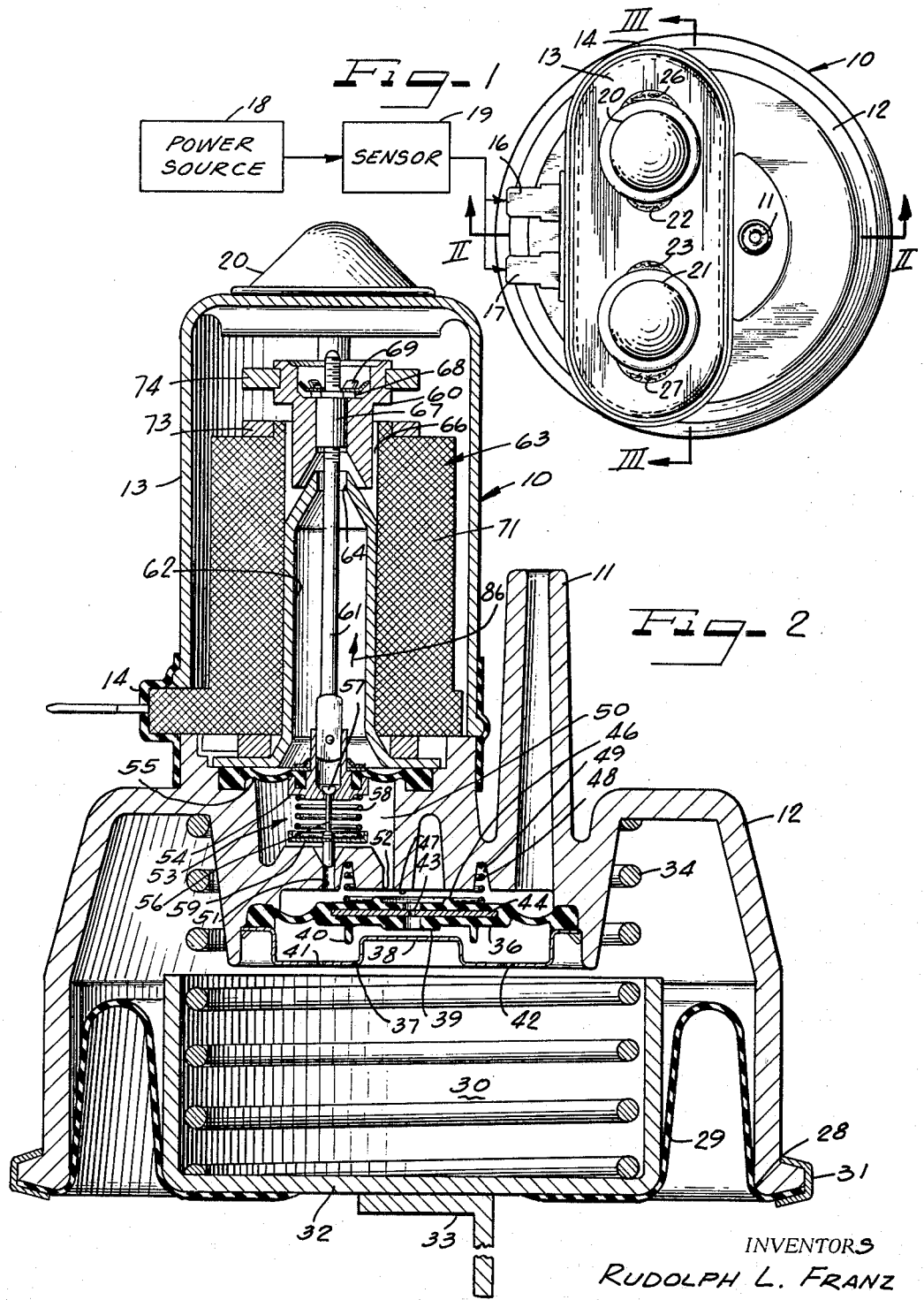

INVENTORS
RUDOLPH L. FRANZ
FRANK E. OBERMAIER
BY *Hill, Sherman, Meroni, Gross & Simpson*  ATTORNEYS United States Patent Office 3,500,722
Patented Mar. 17, 1970

3,500,722
ELECTRO-MAGNETIC TRANSDUCER
Rudolph L. Franz, 312 S. Harvard, Arlington Heights, Ill. 60005, and Frank E. Obermaier, 849 N. Merrill Ave., Park Ridge, Ill. 60068
Continuation of application Ser. No. 558,694, June 20, 1966. This application Dec. 16, 1968, Ser. No. 785,449
Int Cl. F15b 11/08, 13/04, 13/044
U.S. Cl. 91—446                                    2 Claims

ABSTRACT OF THE DISCLOSURE

A transducer for converting electrical signals to pneumatic signals which includes a motor diaphragm positioned within a housing and having valve means controllably actuated in response to electrical signals and controlling the fluid pressure to said motor diaphragm. A control diaphragm is positioned within the transducer to allow the motor diaphragm to be controlled in response to the electrical signals and to seal the motor diaphragm chamber when variations in pressure occur thereby preventing such variations in pressure from effecting a movement of the motor diaphragm. Means are connected between the control valve of the transducer and the electrical solenoid to provide adjustment for adjusting the efficiency of the transducer.

---

This application is a continuation of application Ser. No. 558,694 filed June 20, 1966, and now abandoned.

This invention relates generally to a transducer device and more particularly to a transducer device for converting electrical signals to fluid control signals which, in turn, are used to control the position of a fluid-operated motor or servo.

With the ever increasing use of simple and efficient fluid control motor devices as positioning controls, it has become desirable to develop such devices in the form of a transducer which will not only function as a positioning control but which will also function to convert control signal information directly into mechanical movement. Furthermore, such a transducer device, to provide maximum utility, must be continuously variable between its upper and lower limits rather than a two-position device as is most often the case.

For example, the automotive industry uses pneumatic motors of the vacuum type to control the operation of air vent doors, heater vent doors and other similar apparatus. However, such pneumatic motors are generally of the two-position type, either fully opened or closed. Some automobiles are equipped with electric motors to provide continuous control of such accessory doors. Since electric motors generally are more expensive than the simple pneumatic type, electric motors are usually used only on higher priced automobiles.

Furthermore, to provide such electric motors with automatic controls such that preselected conditions are accurately maintained despite variations of motor conditions, it would require the use of a motor control circuit and such a motor control circuit would add to the cost of the control system.

Therefore, one of the primary objects of the present invention is to provide a simple and inexpensive pneumatic motor which is continuously variable between its upper and lower limits.

Another object of the present invention is to provide a pneumatic motor in the form of a transducer which will convert electric signal information to pneumatic signal information which, in turn, will continuously control the position of the pneumatic motor, thereby obviating the need of special control circuits.

Still another object of the present invention is to provide a transducer device in the form of a pneumatic motor which will not vary its position due to variation in the pressure supply connected thereto.

The transducer device of the present invention has particular utility when used to control the in-car temperature of an automobile. For example, the actuating portion of the pneumatic motor may be connected to a movable door which is positioned within a heating duct to control the amount of hot air passing through the duct to the interior of the automobile. A presettable thermostat device may be positioned within the interior of the car to sense the in-car temperature and to provide an electrical control signal in response to such temperature to operate the transducer device. The electrical control signal is converted directly into a pneumatic signal to control the position of the pneumatic motor.

A feature of the present invention is the use of a valve assembly connected to a pressure sensitive diaphragm which, in turn, is connected to a movable pole piece of a solenoid. A biasing spring is associated with the pole piece to provide a predetermined maximum bias on the pressure diaphragm. Variations in magnetic flux due to energization of the solenoid will cause a corresponding variation in the force transmitted from the pole piece to the pressure diaphragm, thereby controlling the position of the pneumatic motor.

Another feature of the present invention is the use of a special control diaphragm which prevents fluctuation of the pneumatic motor due to fluctuations of the pneumatic supply connected thereto. This feature is particularly advantageous when the transducer device is used in conjunction with an automobile vacuum supply which changes under varying conditions of engine load.

Briefly, the transducer device of the present invention includes a diaphragm motor which forms one wall of a pneumatic chamber. Pressure is delivered within the chamber in response to the position of a control diaphragm which is located between a fluid inlet and the chamber. A pressure diaphragm is connected to spring-biasing means through a movable pole piece of a solenoid. A valve assembly is associated with the pressure diaphragm to control the fluid pressure on one side of the control diaphragm. As energizing current is delivered to the solenoid, the pressure exerted on the pressure diaphragm by the movable pole piece is varied, and the valve assembly associated with the pressure diaphragm will cause a corresponding variation in the position of the control diaphragm to change the position of the motor diaphragm.

Other objects and features will be more fully realized and understood from the following detailed description when taken in conjunction with the accompanying drawings in which like reference numerals throughout the various views of the drawings are intended to designate similar elements or components and wherein:

FIGURE 1 is a top plan view of a transducer device constructed in accordance with the principles of this invention;

FIGURE 2 is an elevational sectional view taken along the line II—II of FIGURE 1 and shows the detailed construction of the internal parts of the transducer device.

As shown on the drawings:

Figure 3:
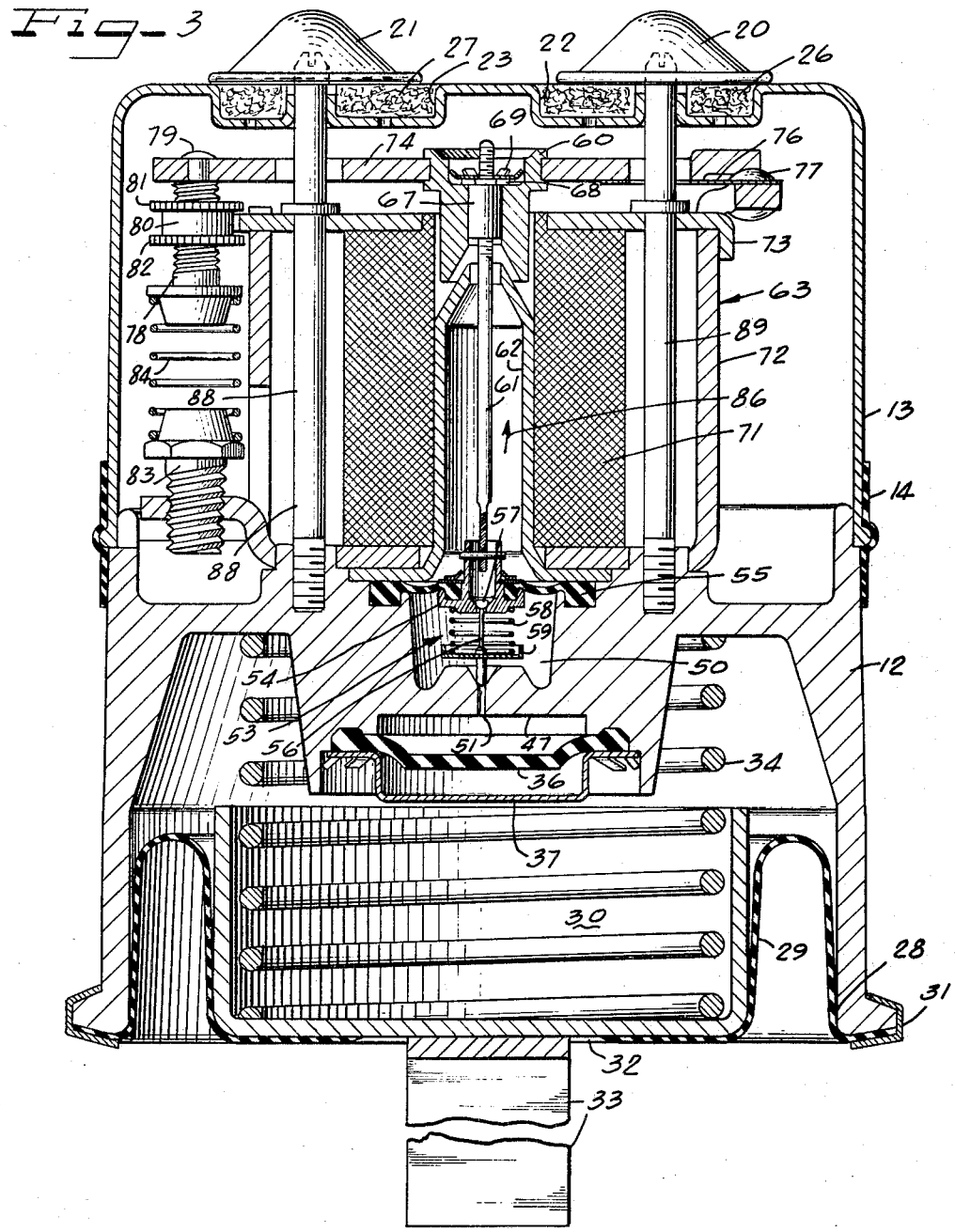
FIGURE 3 is an elevational sectional view taken along the line III—III of FIGURE 1 and which also shows the detailed construction of the internal parts of the transducer device.

As seen in FIGURE 1, a transducer 10 has an inlet 11 formed as an integral part of a housing 12. The inlet 11 is connectible to a source of vacuum which may be provided by the engine of an automobile. Mounted on the housing 12 is a solenoid cover 13 which is secured thereto by a sealing band 14. The solenoid cover 13 houses a solenoid which will be described hereinbelow.

A pair of terminals 16 and 17 extend from the solenoid cover 13 for receiving energizing current from a power source 18 via a temperature sensing device 19. The temperature sensing device 19 may be located in the interior of an automobile and may be selectively adjustable so that an operator may select the desired in-car temperature.

A pair of dome-shaped circular retainers 20 and 21 are mounted on the solenoid cover 13 and overlie a pair of oblong depressions 22 and 23, respectively. The depressions 22 and 23 are provided with a plurality of openings for communicating atmospheric pressure to the interior of the solenoid, as will be described in greater detail hereinbelow. Air filters 26 and 27 are placed in the depressions 22 and 23 and retained therein by the circular retainers 20 and 21, respectively.

As seen in FIGURES 2 and 3, the housing 12 has an opening 28 formed at one end thereof for receiving a motor diaphragm 29. The motor diaphragm 29 forms one wall of a main pressure chamber 30 within the housing 12. The outer peripheral edge of the diaphragm 29 is secured to the housing 12 by a retaining ring 31. However, the inner peripheral edge of the diaphragm 29 is secured to a cup-shaped backing plate 32. Also secured to the backing plate 32 is an extended bracket 33 which may be connected to a heater door of an automobile. Therefore, variations in position of the diaphragm 29 will cause corresponding variations in position of the heater door to control the in-car temperature of an automobile.

A spring 34 is positioned within the chamber 30 for biasing the backing plate 32 and diaphragm 29 outwardly of the transducer 10. Positioned between the inlet 11 and the main chamber 30 is a control diaphragm 36 which is held in place by a retainer 37. The retainer 37 has a detented portion 38 which is adjacent an annular flange 39 of the diaphragm 36. Also, an annular flange 40 is formed on the diaphragm 36 outwardly of the annular flange 39 and extends beyond the detented portion 38. A pair of openings 41 and 42 are provided in the retainer 37, and a metering orifice 43 is formed through a backing plate 44 within the diaphragm 36. Therefore, negative pressure applied to the inlet 11 will pass through the metering orifice 43 and into the main chamber 30 through the openings 41 and 42. However, should the negative pressure applied to the inlet 11 increase, i.e., become more positive, the diaphragm 36 will be urged toward the retainer 37 and the annular ring 39 will abut against the detented portion 38 to seal the main chamber 30. This action will maintain the position of the motor diaphragm 29 substantially constant when the negative pressure increases due to engine load or the like.

An annular flange 46 is formed on the diaphragm 36 opposite the annular flange 39 and is engageable with the surface of a wall 47 within the housing 12. The spring 48 is positioned between the diaphragm 36 and the wall 47 and is retained in position by an annular groove 49.

A control chamber 50 is formed within the housing 12 and is in fluid communication with the inlet 11 through a pair of apertures 51 and 52. The aperture 51 is located radially outwardly of the annular flange 46, and the aperture 52 is located radially inwardly of the annular flange 46. Therefore, negative pressure applied to the inlet 11 is delivered to the control chamber 50 through one or both of the apertures 51 and 52 depending upon the position of the diaphragm 36 or the position of a valve assembly 53.

The valve assembly 53 comprises an apertured valve body 54 which is secured substantially concentric to a pressure diaphragm 55. A valve stem 56 extends through the valve body 54 toward the aperture 51 and in abutting relation therewith. The valve stem 56 has an enlarged portion 57 which engages the aperture in the valve body to form a valve seat therewith. A spring 58 is positioned between the valve body 54 and a retainer 59 for urging the valve head 57 in sealing relation with the aperture of the valve body 54. Therefore, should the diaphragm 55 move downwardly, as seen on the drawings, the valve stem 56 will engage the periphery of the aperture 51 and urge the stem upwardly to open the valve seat formed between the valve body 54 and the valve head 57.

The valve body 54 is connected to a movable pole piece 60 by a control rod 61 which passes through a hollow core 62 of a solenoid assembly 63. The core 62 has one end thereof conically shaped to define an opening 64. Also, the portion of the pole piece 60 which extends into the solenoid 63 has a reduced diameter thereby defining an air passage 66 between the pole piece 60 and the solenoid 63. Therefore, when the valve head 57 becomes disengaged with the peripheral surface of the aperture in the valve body 54, atmospheric pressure will be delivered to the control chamber 50 via the openings within the detent portions 22 and 23 of the valve cover 13.

The control rod 61 is threadedly connected to an adjusting nut 67 and held in place by a lock nut 68 and a retainer 69. The adjusting nut 67 is used to control the effective length of the control rod 61 which, in turn, will control the position at which the valve assembly 53 will operate. This adjustment is defined as an efficiency adjustment.

As best seen in FIGURE 3, the solenoid assembly 63 includes a coil 71 which is secured to a frame 72 by a retainer plate 73. The pole piece 60 is secured to a rocker arm 74 for movement therewith. One end of the rocker arm 74 is secured to the frame 72 via a leaf spring 76 which, in turn, is secured to the frame 72 by a rivet 77. The leaf spring 76 forms a frictionless pivot for the rocker arm 74. The other end of the rocker arm 74 is connected to a spring retainer 78 by a rivet 79 which is formed as an integral part thereof. An adjusting nut 80 is threadedly connected to the spring retainer 78. The adjusting nut 80 is provided with a pair of axially spaced apart annular flanges 81 and 82 which overlie a portion of the retainer 73. The adjusting nut 80 determines the length of travel of the rocker arm 74 thereby limiting the axial travel of the valve assembly 53 between predetermined limits. The adjusting nut 80 is defined as an over-travel adjustment.

Connected to the frame 72 opposite the spring retainer 78 is a spring adjusting nut 83 which also serves as a spring retainer. Positioned between the spring retainer 78 and adjusting nut 83 is a spring 84 which biases the rocker arm 74 and the control rod 61 in the direction indicated by the arrow 86. Therefore, energization of the solenoid 63 will create a magnetic force which is in opposition to the bias of spring 84 thereby causing the control rod 61 and valve assembly 53 to move in the direction opposite the arrow 86.

A pair of screws 88 and 89 pass through the retainer 73 and rocker arm 74 and are threaded into the housing 12 thereby securing the solenoid assembly 63 in position.

In operation, with a source of negative pressure applied to the inlet 11, and with no input signal applied to the solenoid 63, the valve stem 56 will be disengaged from the aperture 51. Therefore, negative pressure will be delivered to the control chamber 50 through the apertures 51 and 52. Also, negative pressure will be delivered to the main control chamber 30 through the metering orifice 43 of the diaphragm 36. This action will pull the diaphragm 29 and retainer 32 inwardly with respect to the housing 12. Should the negative pressure delivered to the control chamber 50 be sufficient to cause the valve assembly 53 and diaphragm 55 to be moved downwardly, as seen on the drawings, the valve stem 56 will engage the aperture 51 thereby closing the aperture 51. Also, the diaphragm 36 will be urged upwardly so that the annular flange 46 engages the surface of the wall 47, thereby closing the aperture 52 with respect to the inlet 11. This section is due to the pressure differential on opposite sides of the diaphragm 36, which pressure differential is controlled by the metering orifice 43. However, a portion of the negative pressure within the control chamber 50 will lead through the aperture 52 and through the metering orifice 43 into the main control chamber 30, thereby equalizing the pressure within the two chambers. Since the total surface area defined radially inwardly of the annular flange 46 is relatively small as compared to that defined radially outwardly thereof, the negative pressure from the inlet 11 will prevail thereby maintaining the diaphragm 36 urged against the surface of the wall 47.

When a maximum value control signal is applied to the solenoid 63, the rocker arm 74 and pole piece 60 are urged downwardly. This action will cause the head portion 57 of the valve stem 56 to become disengaged with the periphery of the aperture within the valve body 54, thereby providing an air passage from the control chamber 50 through the solenoid assembly 63 and through the aperture within the upper portion of the solenoid cover 13. This increased pressure will be delivered to the main control chamber 30 through the aperture 52 and the metering orifice 43, thereby changing the position of the motor diaphragm 29. This action will continue until the pressure within the control chamber 50 has increased sufficiently to cause the upward bias on the control rod 61, due to the spring 84, to again seal the aperture within the valve body 54 against the valve head 57.

Should the input pressure increase for one reason or another, the diaphragm 36 will be urged toward the retainer 37 such that the annular ring 39 will abut against the detent portion 38 thereby sealing the main control chamber 30. Therefore, the position of the motor diaphragm 29 will not vary due to changes in input pressure. The adjusting nut 83 is used to adjust the tension provided by the spring 84 which, in turn, will calibrate the maximum inward position of the motor diaphragm 29 relative to the housing 12.

Therefore, the present invention has provided a new and improved pneumatic motor in the form of a transducer which converts electrical input signals to pneumatic control signals for controlling the position of the motor diaphragm.

Modifications and variations may be effected without departing from the spirit and scope of the novel concepts of this invention.

We claim as our invention:

1. A transducer for converting an electrical signal to a fluid signal, comprising:
    a housing having an opening formed at one end thereof,
    a motor diaphragm secured to said housing over said opening to form a main fluid receiving chamber within said housing,
    means for biasing said motor diaphragm in one direction,
    an inlet on said housing connectable to a source of fluid pressure for delivering of pressure to said main chamber to provide a motive force on said motor diaphragm,
    a solenoid mounted on said housing and electrically connectable to a source of energizing current,
    a pole piece movably mounted on said solenoid and positionable in response to the magnitude of said energizing current,
    a valve connected to said pole piece and operated in response to said energizing current to control the amount of fluid pressure delivered from said inlet to said main receiving chamber,
    a control diaphragm positioned within said main receiving chamber, said control diaphragm having an aperture therethrough to provide a fluid path from said valve to said main receiving chamber; and
    seat means positioned within said main receiving chamber and overlying but not sealing the aperture in said control diaphragm where the source of fluid pressure is within a predetermined range,
    whereby, variations in energizing current applied to said solenoid will cause a corresponding variation in position of said fluid control means to control the pressure delivered to said main receiving chamber which, in turn, will control the position of said motor diaphragm, and variations in fluid pressure from the source will cause said control diaphragm to move toward said seat means and seal the aperture in said control diaphragm to prevent the change in fluid pressure to effect movement of said motor diaphragm.

2. A transducer for converting an electrical signal to a fluid signal according to claim 1 further including adjusting means connected between said pole piece and said valve means for adjusting the efficiency of said transducer.

References Cited

UNITED STATES PATENTS

| | | |
|---|---|---|
| 2,915,045 | 12/1959 | Mackenzie. |
| 2,964,051 | 12/1960 | Garnett. |
| 3,073,345 | 1/1963 | Hagler. |
| 3,094,132 | 6/1963 | Byloff. |
| 3,155,104 | 11/1964 | Hilgert. |
| 3,334,642 | 8/1967 | Borthwick. |

CARROLL B. DORITY, JR., Primary Examiner

U.S. Cl. X.R.

60—60; 91—459; 137—496, 596.11